(12) United States Patent
Trojansky

(10) Patent No.: US 11,810,254 B2
(45) Date of Patent: Nov. 7, 2023

(54) DISPLAYING A SCENE TO A SUBJECT WHILE CAPTURING THE SUBJECT'S ACTING PERFORMANCE USING MULTIPLE SENSORS

(71) Applicant: Netflix, Inc., Los Gatos, CA (US)

(72) Inventor: Stephan Trojansky, Los Angeles, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 17/709,126

(22) Filed: Mar. 30, 2022

(65) Prior Publication Data

US 2022/0319115 A1    Oct. 6, 2022

Related U.S. Application Data

(60) Provisional application No. 63/168,558, filed on Mar. 31, 2021.

(51) Int. Cl.
| | |
|---|---|
| *G06T 17/20* | (2006.01) |
| *G06T 7/73* | (2017.01) |
| *G06T 1/00* | (2006.01) |
| *B25J 19/02* | (2006.01) |
| *G06T 15/04* | (2011.01) |

(52) U.S. Cl.
CPC ............. *G06T 17/20* (2013.01); *B25J 19/021* (2013.01); *G06T 1/0014* (2013.01); *G06T 7/74* (2017.01); *G06T 15/04* (2013.01)

(58) Field of Classification Search
CPC ......... G06T 17/20; G06T 7/74; G06T 1/0014; G06T 15/04; B25J 19/021
See application file for complete search history.

(56) References Cited

U.S. PATENT DOCUMENTS

| | | | |
|---|---|---|---|
| 11,577,177 B2 † | 2/2023 | Guertin | |
| 2013/0181901 A1* | 7/2013 | West | H04N 9/3147 345/1.3 |
| 2015/0055101 A1* | 2/2015 | Kim | H04N 9/3147 353/94 |
| 2018/0059528 A1* | 3/2018 | Gocke | H04N 9/3147 |
| 2022/0319115 A1* | 10/2022 | Trojansky | B25J 19/021 |

OTHER PUBLICATIONS

Enrico Calabrese†, DHP19: Dynamic Vision Sensor 3D Human Pose Dataset, 2019, pp. 1-10.*
PCT/US2022/035002 International Search Report and Written Opinion dated Oct. 10, 2022.

* cited by examiner
† cited by third party

*Primary Examiner* — Abderrahim Merouan
(74) *Attorney, Agent, or Firm* — Greenberg Traurig, LLP

(57) ABSTRACT

A system surrounds an area with a first set of display panels. A second set of display panels is positioned above the area, and a third set of display panels is positioned below the area. A subject is positioned within the area and may be on an omnidirectional treadmill within the area. A controller communicates content to the first set of display panels, the second set of display panels, and the third set of display panels that presents a multidimensional scene when displayed. A set of sensors capture sensor data of the subject within the area while content is displayed. One or more of the sensors may be coupled to a repositioning system that repositions sensors so the subject remains in a field of view of different sensors. From sensor data of the subject, a representation of the subject may be generated for insertion into other video content.

19 Claims, 8 Drawing Sheets

800

DISPLAYING A SCENE TO A SUBJECT WHILE CAPTURING THE SUBJECT'S ACTING PERFORMANCE USING MULTIPLE SENSORS

CROSS REFERENCE TO RELATED APPLICATIONS

This application claims the benefit of U.S. Provisional Application No. 63/168,558, filed Mar. 31, 2021, which is incorporated by reference in its entirety.

BACKGROUND

This invention relates generally to enabling digital acting performance, and more specifically to a system for displaying a dynamic, multidimensional scene to a subject while capturing the subject's acting performance using multiple sensors, such as cameras.

An increasing number of safety measures have been implemented for filming. These have increased complexity and cost for capturing content, such as video for presentation to subjects. For example, maintaining increased distance between actors and other personnel has limited the number of actors or other personnel capable of being on site for capturing video or other content, increasing times and complexity for capturing video including multiple actors. Further, other precautions to provide more sanitary environments have increased overall costs for capturing video.

SUMMARY

A system at least partially surrounds an area with a first set of display panels. In some embodiments, the first set of display panels surrounds the area in 360 degrees, though the first set of display panels may have an opening to allow a subject to enter and exit the system. A second set of display panels is positioned above the area (e.g., on a ceiling), and a third set of display panels may be positioned below the area (e.g., on a floor). In some embodiments, an omnidirectional treadmill is included within the area, with the second set of display panels and the third set of display panels positioned relative to the omnidirectional treadmill.

A controller communicates content to the first, second, and third sets of display panels, which display the content and thereby present a multidimensional scene to a subject that is in the system. In various embodiments, the controller updates the content displayed by the first, second, and/or third sets of display panels in response to information describing movement of the subject within the area. The movement of the subject may be determined from sensor data that is captured by different sensors throughout the system. For example, the sensors may measure a distance of the subject (or a portion thereof) to the sensor, and the distances are then used to triangulate the location of the subject within the area. Alternatively, the motion of the subject may be received from the omnidirectional treadmill in embodiments where the subject is on the omnidirectional treadmill. In some embodiments, the content displayed by the first, second, and/or third sets of display panels is updated by the controller in response to the controller's determination of movement of the subject within the area. This allows the content displayed by the first, second, and/or third sets of display panels to update the multidimensional scene to simulate the subject's moving through an environment that is depicted by the multidimensional scene.

For example, controller 130 modifies content displayed by one or more of first set of display panels 110, the second set of display panels 115, and the third set of display panels 120 based on a rate of speed at which the subject moves on the omnidirectional treadmill 105 or within the area enclosed by the first set of display panels 110, the second set of display panels 115, and the third set of display panels 120, so the displayed content replicates the subject walking through an environment represented by the content. Similarly, the controller 130 updates content displayed by one or more of the first set of display panels 110, the second set of display panels 115, and the third set of display panels 120 based on a direction in which the omnidirectional treadmill 105 is oriented or based on a direction of movement of the subject within the area enclosed by the first set of display panels 110, the second set of display panels 115, and the third set of display panels 120. For example, content displayed by the first set of display panels 110 is modified to display content captured from a different point of view that corresponds to a direction in which the omnidirectional treadmill 105 is pointed in some embodiments or a direction in which the subject has moved within the area enclosed by the first set of display panels 110, the second set of display panels 115, and the third set of display panels 120, allowing the displayed content to correspond to content from a point of view of the direction of movement of the subject or a direction of the omnidirectional treadmill 105.

A set of sensors are configured to capture sensor data of the subject within the area while the content is displayed. For example, one or more of the sensors may include cameras that capture sensor data comprising images or video of the subject within the area. In some embodiments, the sensor data captures the subject on the omnidirectional treadmill. Texture information and a three-dimensional representation of the subject may be determined from the captured sensor data of the subject and then used to render a depiction of the subject in a three-dimensional scene to create video content. The scene in which the subject is rendered may be rendered from a three-dimensional model or may be captured by a 360-degree camera that is used to capture a location. The same scene may be displayed via the first, second, and/or third sets of display panels while the set of sensors are used to capture images of the subject, thereby giving the subject visual cues about the environment in which the subject's performance will be seen by an audience. This may assist the subject in delivering a more realistic acting performance, for example as compared to an environment in which the subject has to imagine the environment that will be seen by an audience.

In some embodiments, one or more of the sensors are coupled to a repositioning system, such as a robotic arm. The repositioning system receives instructions from the controller and moves to reposition one or more sensors coupled to the repositioning system. The controller may generate instructions for a repositioning system by determining a location within the area of a portion of the subject from sensor data captured by multiple sensors. The location of the subject within the area may be determined, for example, by measuring the distance of the subject to multiple of the sensors and then triangulating the subject's location within the area. Such generation of instructions allows the controller to reposition sensors via a coupled repositioning system, which allows the portion of the subject to remain in a field of view of the sensors as the subject moves within the area. Moreover, this enables a sensor to be fixed on a portion of the subject and thereby obtain higher-resolution information about that portion. For example, a higher-resolution camera can follow an actor's face, where it may be more important to have better information for later reconstruction by computer models. Beneficially, if a sensor moves with the subject as opposed to being fixed in the system, errors in the measurements may be reduced (e.g., reduced motion blur in the case of camera sensors).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
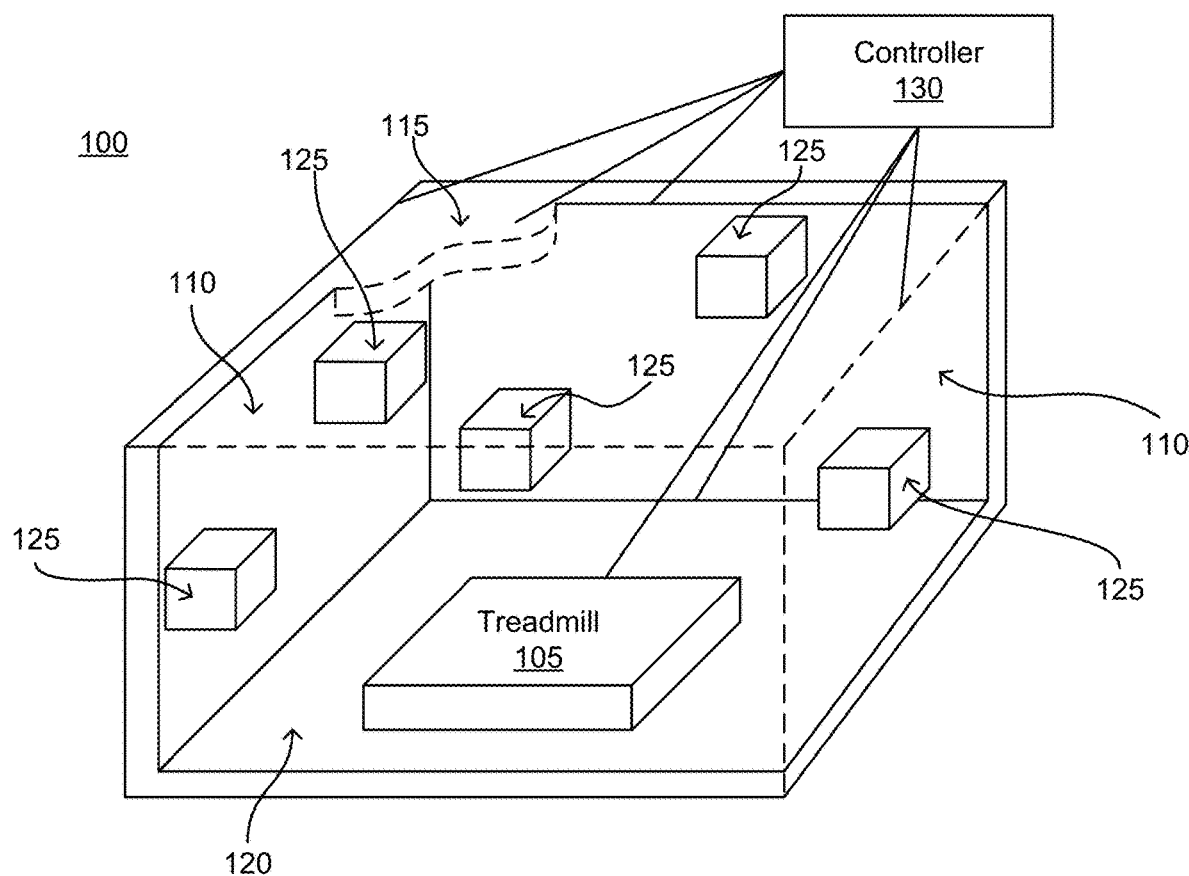
FIG. 1 is a block diagram of a system for enabling a digital acting performance by a subject, in accordance with an embodiment.

FIG. 1 is a block diagram of one embodiment of a system 100 for enabling a digital acting performance by a subject. In the embodiment shown by FIG. 1, the system 100 includes an omnidirectional treadmill 105, a first set of display panels 110, a second set of display panels 115, a third set of display panels 120, a set of sensors 125, and a controller 130. In other embodiments, the system 100 includes different or additional components than those described in conjunction with FIG. 1. Further, in some embodiments, the system 110 includes fewer components than those described in conjunction with FIG. 1.

The omnidirectional treadmill 105 allows a subject to perform locomotive motion (e.g., walking, running, etc.) in any direction. This allows the omnidirectional treadmill 105 to provide a subject with 360 degrees of movement, reducing an amount of space occupied by the system 100 without limiting the subject's freedom of movement.

The first set of display panels 110 encloses the omnidirectional treadmill 105 and are configured to display content to a subject on the omnidirectional treadmill 105. For example, the first set of display panels 110 comprises a plurality of light emitting diode (LED) displays, organic light emitting diode (OLED) displays, or other suitable display devices that are positioned adjacent to each other and surround the omnidirectional treadmill 105 in 360 degrees; although the first set of display panels 110 may comprise a single display panel configured to enclose or to encircle the omnidirectional treadmill 105 in some embodiments. In other embodiments, the first set of display panels 110 surround the omnidirectional treadmill by 180 degrees. The first set of display panels 110 receive content from the controller 130, further described below, and display the content, allowing a subject on the treadmill to view the content. In embodiments where the first set of display panels 110 surrounds the omnidirectional treadmill 105 in 360 degrees, a subject on the treadmill is capable of viewing content via the first set of display panels 110 in all directions surrounding the subject. The first set of display panels 110 may be coupled to a wall or other structure surrounding or enclosing the omnidirectional treadmill 105 in some embodiments. Additionally, the first set of display panels 110 may extend between the second set of display panels 115 and the third set of display panels 120 in some embodiments, so the distance between the second set of display panels 115 and the third set of display panels 120 determines a height of the first set of display panels 105.

The second set of display panels 115 are positioned above the omnidirectional treadmill 105, such as on a ceiling, and are configured to display content received from the controller 130, further described below. For purposes of illustration, FIG. 1 depicts a portion of the second set of display panels 115, with the remaining portion, which would be perpendicular to the first set of display panels 110 and above the first set of display panels 110 depicted as transparent to allow viewing of the area enclosed by the first set of display panels 110 and by the second set of display panels 115. In some embodiments, the second set of display panels 115 comprises a plurality of light emitting diode (LED) displays, organic light emitting diode (OLED) displays, or other suitable display devices that are positioned above the omnidirectional treadmill 105, although the first set of display panels 110 may comprise a single display panel in some embodiments. The second set of display panels 115 is positioned a specific distance above the omnidirectional treadmill 105 in some embodiments to provide clearance between the second set of display panels 115 and a subject on the omnidirectional treadmill 105. In various embodiments, the second set of display panels 115 are coupled to a ceiling or other structure positioned above the omnidirectional treadmill 105. Alternatively, the second set of display panels 115 are suspended above the omnidirectional treadmill 105 using any suitable device. In various embodiments, the second set of display panels 115 has a width determined by a distance between a first side of the first set of display panels 110 proximate to a first side of the omnidirectional treadmill 105 and a second side of the first set of display panels 110 that is parallel to the first side of the first set of display panels 105 and proximate to a second side of the omnidirectional treadmill 105. Similarly, a length of the second set of display panels 110 may be determined by a distance between a front of the first set of display panels 110 proximate to a front of the omnidirectional treadmill 105 and a rear of the first set of display panels 105 that is parallel to the front of the first set of display panels 110 and proximate to a rear of the omnidirectional treadmill 105.

The third set of display panels 120 are positioned below the omnidirectional treadmill 105, such as on a floor, and are configured to display content received from the controller 130, further described below. In some embodiments, the third set of display panels 120 comprises a plurality of light emitting diode (LED) displays, organic light emitting diode (OLED) displays, or other suitable display devices that are positioned below the omnidirectional treadmill 105; although the first set of display panels 110 may comprise a single display panel in some embodiments. The third set of display panels 120 is positioned a specific distance below a surface of the omnidirectional treadmill 105 on which a subject moves, in some embodiments, to provide clearance between the third set of display panels 120 and a subject on the omnidirectional treadmill 105. Alternatively, the second set of display panels is in a common plane as the surface of the omnidirectional treadmill 105 on which the subject moves. In various embodiments, the third set of display panels 120 are coupled to a floor or other structure positioned below the omnidirectional treadmill 105. Alternatively, the third set of display panels 120 are positioned below a surface of the omnidirectional treadmill 105 (or flush with the surface of the omnidirectional treadmill) using any suitable device. In various embodiments, the third set of display panels 120 has a width determined by a distance between a first side of the first set of display panels 105 proximate to a first side of the omnidirectional treadmill 105 and a second side of the first set of display panels 110 that is parallel to the first side of the first set of display panels 105 and proximate to a second side of the omnidirectional treadmill 105. Similarly, a length of the third set of display panels 120 may be determined by a distance between a front of the first set of display panels 110 proximate to a front of the omnidirectional treadmill 105 and a rear of the first set of display panels 110 that is parallel to the front of the first set of display panels 105 and proximate to a rear of the omnidirectional treadmill 110.

The controller 130 communicates with the first set of display panels 110, the second set of display panels 115, and the third set of display panels 120 to specify content displayed by the first set of display panels 110, the second set of display panels 115, and the third set of display panels 120. Example content displayed includes 360-degree photographs, 360-degree videos, two dimensional videos, three-dimensional videos, rendered content (e.g., real time content rendered by a graphics engine). As another example, the displayed content is video of an additional subject in an additional system 100 in a different location, allowing the subject to react to actions by the additional subject in the additional system 100. Beneficially, this allows subjects in different locations (which could be in different parts of the world) to interact with each other in real-time, or in near-real time, through the content displayed by one or more of the first set of display panels 110, the second set of display panels 115, and the third set of display panels 120. While content is displayed by the first set of display panels 110, the second set of display panels 115, and the third set of display panels 120, the set of sensors 125 captures images or video of the subject within the area enclosed by the first set of display panels 110, the second set of display panels 115, and the third set of display panels 120 (e.g., on the omnidirectional treadmill 105). The captured images or video may include reactions of the subject to the displayed content, as may include movement of the subject within the area enclosed by the first set of display panels 110, the second set of display panels 115, and the third set of display panels 120, such as movement of the subject on the omnidirectional treadmill 105, while the content is displayed by the first set of display panels 110, the second set of display panels 115, and the third set of display panels 120.

Figure 2:
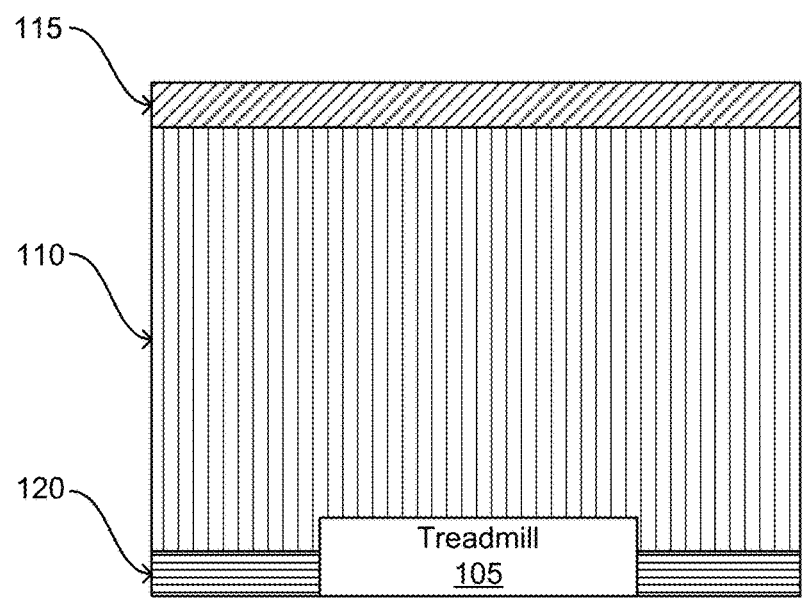
FIG. 2 is a side view of a system for enabling a digital acting performance by a subject, in accordance with an embodiment.

FIG. 2 is a side view of the system 100 shown in FIG. 1. As shown in FIG. 2, the system 100 includes an omnidirectional treadmill 105. A first set of display panels 110 surrounds an area, which may include the omnidirectional treadmill 105. In various embodiments, the first set of display panels 110 encircles or encloses the area, which may include the omnidirectional treadmill 105. The first set of display panels 110 may be coupled to a wall that surrounds or partially surrounds the area.

A second set of display panels 115 is positioned above the area and may be above the omnidirectional treadmill 105 in some embodiments. The second set of display panels 115 may be coupled to a ceiling or other structure positioned over the omnidirectional treadmill 105 area (or positioned over the omnidirectional treadmill 105) in some embodiments. Additionally, in some embodiments, the system 100 includes a third set of display panels 120 positioned below at least one surface of the area, such as below or in a common plane with a surface of the omnidirectional treadmill 105. The third set of display panels 120 may be coupled to a floor or another structure positioned below at least one surface of the omnidirectional treadmill 105 or of the area in some embodiments.

Figure 3:
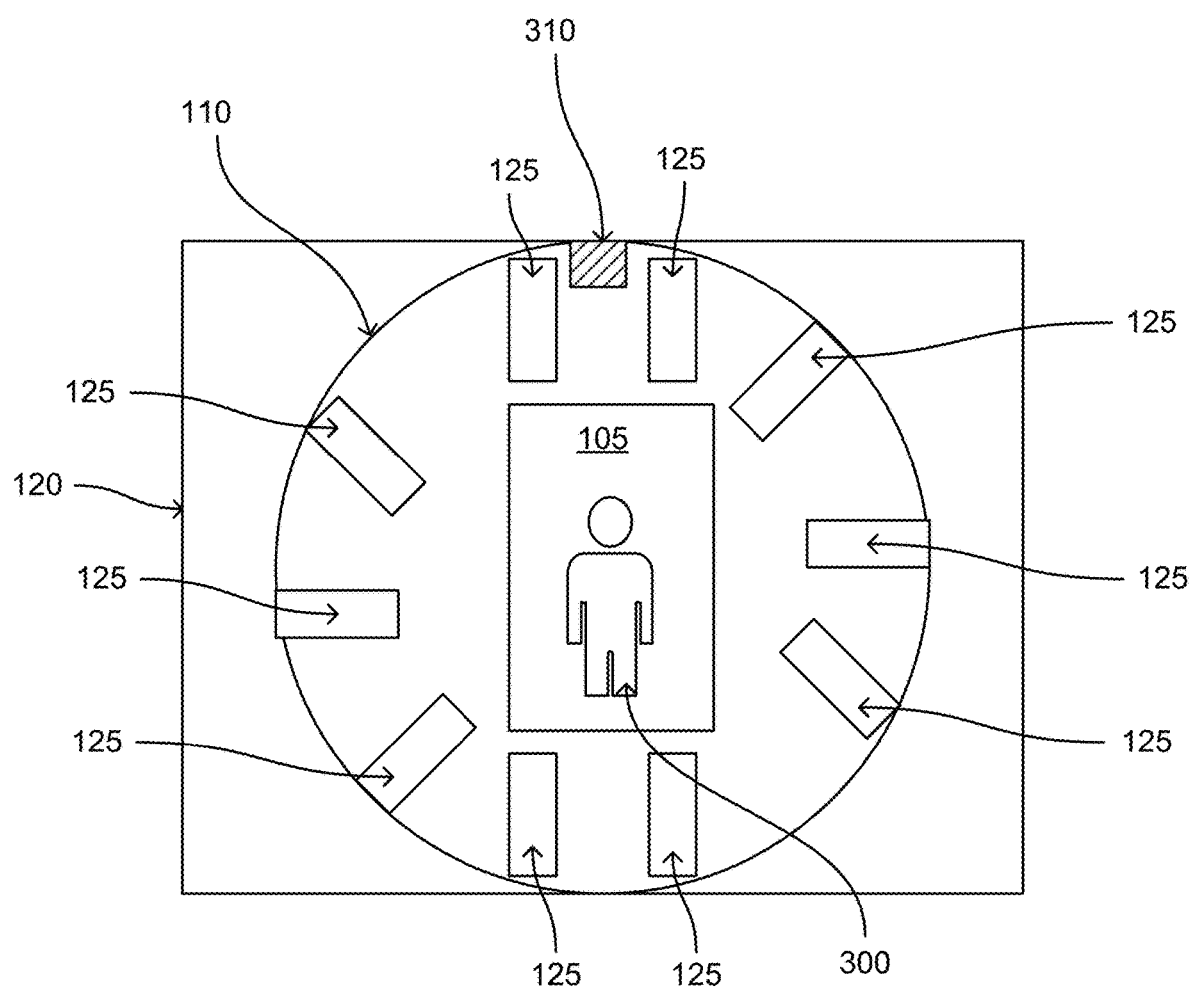
FIG. 3 is an overhead view of a portion of the system for enabling a digital acting performance by a subject, in accordance with an embodiment.

FIG. 3 is an overhead view of a portion of the system 100 for enabling digital acting. For purposes of illustration, FIG. 3 does not show the second set of display panels 115 positioned above the omnidirectional treadmill 105 to show additional details about the configuration of the remaining components of the system 100. Thus, FIG. 3 shows the omnidirectional treadmill 105, the first set of display panels 110, the third set of display panels 120, and the set of sensors 125. In other embodiments, the area surrounded by the first set of display panels 110 does not include the omnidirectional treadmill 105, as further described above in conjunction with FIG. 4. Further, the embodiment shown in FIG. 3 depicts a subject 305 on the omnidirectional treadmill and includes an increased resolution display 310 as part of the first set of display panels 110.

As shown in FIG. 3, the first set of display panels 110 surround the omnidirectional treadmill 105. In the example of FIG. 3, the first set of display panels 110 encircle the omnidirectional treadmill 105, or an area, in 360 degrees. However, in other embodiments, the first set of display panels 110 less than fully surrounds the omnidirectional treadmill 105 or the area. For example, the first set of display panels 110 surrounds the omnidirectional treadmill 105 in 180 degrees. The display panels 110 surrounding the omnidirectional treadmill 105 may have an opening to allow for ingress and egress of an actor or other subject, where the opening may comprise a barn door or other type of door created from the display panels 110. As further described above in conjunction with FIG. 1, the first set of display panels 110 includes one or more display devices configured to display content to a subject 305 on the omnidirectional treadmill 105.

In the example shown by FIG. 3, the first set of display panels 110 includes one or more increased resolution display devices 310. An increased resolution display device 305 has a higher resolution than other display devices included in the first set of display panels 110. The increased resolution display device 310 is positioned to face the omnidirectional treadmill 105. In some embodiments, the increased resolution display device 310 is positioned to face the omnidirectional treadmill 105 and to be in a line of sight of the subject 305 on the omnidirectional treadmill 105. Further, the increased resolution display device 310 is positioned a distance away from the omnidirectional treadmill 105 that does not interfere with movement of the subject 305 while on the omnidirectional treadmill 105.

The third set of display panels 120 shown in FIG. 3 are positioned below a surface of the omnidirectional treadmill 105 on which the subject 305 stands or are positioned in a common plane as the surface of the omnidirectional treadmill 105 on which the subject 305 stands. As further described above in conjunction with FIG. 1, the third set of display panels 120 obtains content and displays the content to a subject on the omnidirectional treadmill 105. The content displayed by the first set of display panels 110 and the third set of display panels 120 (as well as by the second set of display panels 115) comprises a multidimensional scene, allowing the multidimensional scene to provide cohesive content to the subject 305 on the omnidirectional treadmill 105 when facing different directions.

As depicted in FIGS. 1-3, the system 100 includes a set of sensors 125. The set of sensors 125 may include one or more selected from a group including an optical camera, a thermal camera, an infrared camera, a movie camera, a professional video camera, a camcorder, a high-resolution camera, a pan-tilt-zoom camera, a virtual pan-tilt-zoom camera, a depth camera, and a laser depth scanner. Additional examples of sensors 125 include n other embodiments, one or more of the sensors 125 may be a depth sensor, a LIDAR sensor, an infrared sensor, a thermal sensor, a distance sensor, a motion sensor, a radar sensor, a sonar sensor, or other type of sensor. The set of sensors 125 may include multiple types of sensors, including cameras, in various embodiments. One or more cameras of the set of sensors 125 may be configured to capture images in infrared wavelengths in some embodiments, allowing capture of infrared images as well as color (e.g., RGB) images. Example sensors include cameras, proximity sensors, motion sensors, distance sensors, contact sensors, no contact sensors, load cells, or other suitable sensors. One or more of the sensors may be worn by the subject on the omnidirectional treadmill 105, installed on the omnidirectional treadmill 105, or positioned on a structure supporting the first set of display panels 110, the second set of display panels 115, or the third set of display panels 120.

Various sensors of the set of sensors 125 may be distributed throughout a structure formed by the first set of display panels 110, the second set of display panels 115, and the third set of display panels 120. In different embodiments, the set of sensors 125 may include different numbers of cameras or other sensors. Each sensor of the set of sensors 125 is positioned so the sensor's field of view includes a subject on the omnidirectional treadmill 105. Each sensor 215 of the set is coupled to the controller 130 and is configured to transmit captured sensor data, such as images, to the controller 130 and to receive instructions from the controller 130. Different sensors of the set of sensors 125 capture sensor data from different angles relative to a subject, such as a subject on the omnidirectional treadmill 105, allowing the set of sensors 125 to capture multiple images of a subject on the omnidirectional treadmill 105 from multiple angles. In various embodiments, the sensors 125 are configured to capture sensor data in response to receiving an instruction from the controller 130, and may be configured so multiple sensors 125 (such as all sensors of the set of sensors 125) begin capturing images at a common time, so images captured by different sensors of the set of sensors 125 are synchronized. This synchronization enables the information captured from different sensors to be used to reconstruct a three-dimensional representation of the subject.

Figure 4:
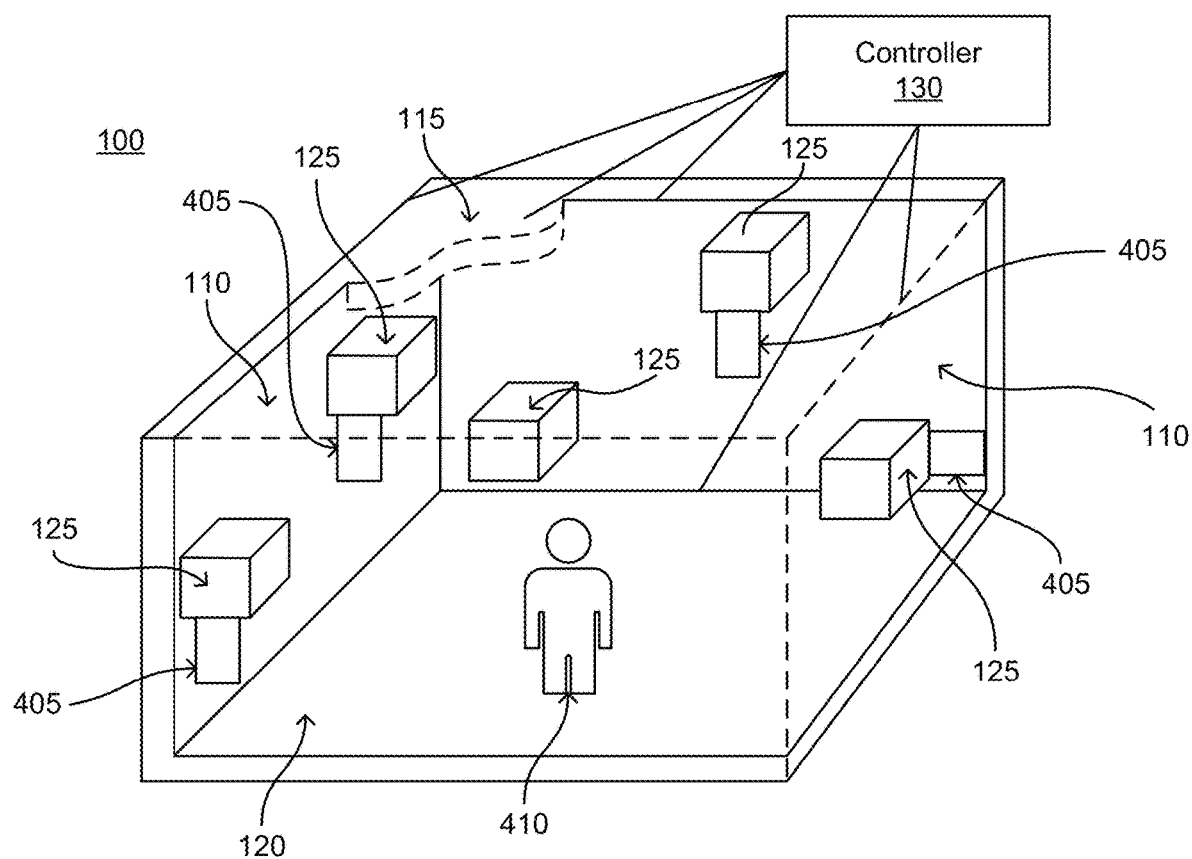
FIG. 4 is a block diagram of an alternative system for enabling a digital acting performance by a subject, in accordance with an embodiment.

Referring to FIG. 4, a block diagram of one embodiment of an alternative system 400 for enabling a digital acting performance by a subject is shown. The alternative system 400 includes a first set of display panels 110, a second set of display panels 115, and a third set of display panels 120, as further described above in conjunction with FIG. 1. The alternative system 400 also includes a set of sensors 125, as further described above in conjunction with FIG. 1. A subject 410 is positioned within the sets of display panels 110, 115, 120. Sensors of the set of sensors 125 capture sensor data describing the subject 410 and communicate the captured sensor data to the controller 130. As depicted in FIG. 4, one or more sensors of the set of sensors 125 are coupled to a repositioning system 405. In the example shown by FIG. 4, each sensor 125 is coupled to a different repositioning system 405. However, in other embodiments, multiple sensors 125 may be coupled to a repositioning system 405, allowing one repositioning system 405 to reposition multiple sensors 125. Example repositioning systems include one or more pan and tilt motors, actuators, pneumatic systems, hydraulic systems, or other suitable movers. In various embodiments, different types of repositioning systems 405 are coupled to different sensors.

At least a subset of the sensors of the set of sensors 125 may be coupled to a repositioning system 405 configured to reposition one or more of the sensors 125. In other embodiments, each sensor 125 of the set of sensors is coupled to a repositioning system 405. A different repositioning system 405 may be coupled to each sensor 125 in some embodiments, while in other embodiments multiple sensors of the set of sensors 125 are coupled to a repositioning system. By repositioning the sensors 125 in response to movement of the subject, the sensors can be positioned to capture more information that will be useful to depict the scene. For example, a high-resolution camera may be mounted on a repositioning system and configured to track an actor's face, thereby capturing high-resolution images of the actor's face for higher quality rendering of the final scene in places where higher quality is needed (e.g., a subject's face).

Example repositioning systems 405 include one or more pan and tilt motors, actuators, pneumatic systems, hydraulic systems, or other suitable movers. For example, one or more sensors of the set of sensors 125 is mounted to a pan and tilt robotic arm or an arm that is configured to pan or tilt or cause one or more sensors 125 to pan or tilt on the arm. Such a configuration allows the pan and tilt robotic arm to reposition one or more sensors to remain focused on a certain portion (e.g., body part such as joint, head, neck, torso, hands, legs, organ, extremity, fingers, toes, stomach, facial feature, eyes, mouth, cheek, nose) of the subject on the omnidirectional treadmill 105. This allows the one or more sensors coupled to the pan and tilt robotic arm to capture more details of the certain body part of the subject while the subject moves on the omnidirectional treadmill 105 or otherwise moves within the system.

The repositioning system receives instructions from the controller 130 in various embodiments and adjusts a position or an orientation of one or more sensors coupled to the repositioning system based on the received instruction. As further described below, the subject or a portion of the subject can be tracked using various techniques.

In one embodiment, the controller 130 receives information about a subject captured from multiple sensors 125 that are at different known locations within the system 100. The received information may include two-dimensional images and depth information. The controller 130 applies one or more trained models to the captured sensor data from the sensors 125 at each of the locations, where the models are trained to identify a portion of the subject in the captured sensor data. For example, a model may comprise a trained neural network that performs facial detection, which identifies a pixel or set of pixels in an image that correspond to a person's face. Other examples of models for tracking a portion of a subject include silhouette detection based skeletal tracking, optical tracking marker based skeletal tracking, and neural network based skeletal tracking models. Other example portions of the subject identified by the trained model include a joint, a head, a neck, a torso, hands, legs, an organ, an extremity, fingers, toes, a stomach, a facial feature, eyes, a mouth, a cheek, a nose, or any other suitable portion of a subject.

In some embodiments, the system may use existing trained models to detect portions of a subject, such as existing facial detection models. However, in some cases the subject may have a form for which there is not a readily available model, such as a mermaid or a cyborg character. In such cases, a new model may need to be trained to track a portion of the subject desired to be tracked, and the system can be used for training such a model. In one embodiment, the system 100 is used to obtain synthetic training data to train a model to track the subject. In such an embodiment, the controller 130 first obtains sensor data for the subject, and a three-dimensional representation is constructed therefrom. Additionally, a set of poses of a skeleton is obtained, where the poses include a motion that matches or otherwise resembles the motion of an acting performance with which the model is to be used. The set of poses may be constructed by a poser tool or obtained using traditional motion capture of a subject wearing markers. Through one or more computer generated imaging (CGI) processes, a set of annotated images (or annotated sensor data) are then generated by applying the motion capture data to the three-dimensional information of the subject, which results in representations of the subject in the desired poses and labels corresponding to the known skeletal model. The annotated images provide additional synthetic data for training the model, which beneficially does not need to be manually annotated or labeled. The machine learning model is then trained using this synthetic data to receive an image or sensor data and to output positions of specific portions of a subject. The machine learning model may be trained according to known techniques. For example, where the model is a neural network, the model is applied to the labeled data and an error term is then backpropagated based on a difference between positions of the subject output by the machine learning model and annotations of the annotated image to which the machine learning model was applied. The backpropagation modifies one or more parameters of the machine learning model based on the error term. The one or more error terms may be generated through any suitable loss function, or combination of loss functions, in various embodiments. The machine learning model may be iteratively updated a specified number of times or until one or more criteria are satisfied. The machine learning model may be an artificial neural network, such as a convolutional neural network, a recurrent neural network, a long short-term memory model, or other suitable type of artificial neural network in various embodiments.

Once the part of the subject to be tracked is detected in an image from each of a set of the sensors, the controller 130 correlates depth information captured from the same location to the locations in the images where the tracked portion is. In various embodiments, the depth information can be directly measured by a sensor or may be computed (e.g., using stereo cameras). Using the depth information from the sensor to the tracked portion of the subject, the controller 130 has thus obtained the distance from the subject to multiple sensors 125 used to track the subject. Moreover, the locations of the sensors 125 themselves are known.

Accordingly, the controller 130 can determine the location of the portion of the subject being tracked by triangulating the subject's distance from each of the sensors 125.

In another embodiment, a portion of a subject may be tracked using other machine vision techniques such as by placing visual markers (such as AprilTags) on portions of the subject to be tracked. An AprilTag is a visual fiducial system, useful for a wide variety of tasks including augmented reality, robotics, and camera calibration. AprilTag detection software can compute the precise three-dimensional position, orientation, and identity of the tags relative to the camera. In yet another embodiment, optical tracking systems such as motion capture can be leveraged, although using this system, additional computer graphics would be necessary. Where visual markers are used on a subject for tracking, they typically need to be removed later using computer graphics techniques. Accordingly, a benefit of using trained models to detect the subject instead of visual markers like AprilTags is to reduce the need for computer graphics processing to remove the tags in the captured video later.

Once the location of the portion of the subject is computed, the controller 130 generates instructions for one or more repositioning systems based on the location of the portion of the subject. This allows sensors coupled to a repositioning system to keep the portion of the subject within fields of view of the one or more sensors. Hence, the controller 130 may generate instructions for repositioning one or more repositioning systems by applying one or more trained models to sensor data captured by sensors of the set of sensors 125 to locate the subject or a portion of the subject within an area surrounded by the first set of display panels 110 and generating instructions so the subject or the portion of the subject remains in a field of view of one or more sensors. The tracking information can be shared across all or a subset of the repositioning systems and can trigger the repositioning of one or more of the repositioning systems as desired.

As noted above, repositioning one or more of the sensors to track the movement of the subject enables the sensor on the repositioning system to capture higher quality information. Specifically, the sensor can be repositioned so that the subject stays within a significant portion of the sensor's field of view, thereby using a larger part of the sensor's resolution. This helps to achieve zoom framing for optimal resolution. Moreover, by moving with the subject, rather than relative to the subject, the sensor can receive data for a longer period of time (e.g., longer exposure time) without incurring motion blur. Finally, by knowing the position of the subject in three-dimensional space, the sensors can be adjusted, e.g., to achieve an ideal focus or depth of field setting.

In alternative embodiments, a subject is positioned within the first set of display panels 110, to the second set of display panels 115, and to the third set of display panels 120 without the omnidirectional treadmill 105. Sensor data captured by various sensors of the set of sensors 125 is communicated to the controller 130, which provides instructions to one or more repositioning systems coupled to sensors of the set of sensors 125. In various embodiments, the controller 130 associates one or more portions of the subject's body with different sensors. Based on sensor data captured by various sensors, and locations of the sensors when the sensor data was captured, the controller 130 determines a position of the subject's subpart/body associated with the sensor and transmits instructions to the repositioning system coupled to the sensor. The repositioning system repositions the sensor based on the instructions received from the controller 130, moving the sensor to keep the associated portion of the subject's body within a field of view of the sensor as the location of the subject within the first set of display panels 110, to the second set of display panels 115, and to the third set of display panels 120 changes. The controller 130 may apply a trained machine-learned model to identify different portions of the subject, such as further described below in conjunction with FIG. 5, in some embodiments. However, in other embodiments, the controller may use other methods to identify portions of the subject, such as identifying visual fiducial markers applied to different portions of the subject from captured sensor data.

In some embodiments, different groups of sensors are allocated to different subjects within an area surrounded by the first set of display panels 110, the second set of display panels 115, and the third set of display panels 120. For example, a first group of sensors are associated with a first subject and a second group of sensors are associated with the second subject. Repositioning systems coupled to sensors in the first set receive instructions from the controller 130 that are generated from a position of the first subject within the area surrounded by the first set of display panels 110, the second set of display panels 115, and the third set of display panels 120. Similarly, repositioning systems coupled to sensors in the second set receive instructions from the controller 130 that are generated from a position of the second subject within the area surrounded by the first set of display panels 110, the second set of display panels 115, and the third set of display panels 120. Hence, different groups of sensors may be repositioned based on movement of different subjects within the area surrounded by the first set of display panels 110, the second set of display panels 115, and the third set of display panels 120, allowing tracking of different subjects within the area surrounded by the first set of display panels 110, the second set of display panels 115, and the third set of display panels 120 by different sensors.

The set of sensors 125 are distributed throughout a structure formed by the first set of display panels 110, the second set of display panels 115, and the third set of display panels 120. As shown in FIG. 3, each camera of the set of sensors 125 is positioned so the camera's field of view includes a subject on the omnidirectional treadmill 105. Different cameras of the set of sensors 125 have different imaging angles of the subject on the omnidirectional treadmill 105, allowing the set of sensors 125 to capture multiple images of a subject on the omnidirectional treadmill 105 from multiple imaging angles. As further described above in conjunction with FIG. 1, at least a subset, or all, of the cameras of the set of sensors 125 may be coupled to a repositioning system configured to reposition one or more of the cameras. Each sensor 215 of the set is coupled to a controller 130 and is configured to transmit captured images to the controller 130 and to receive instructions from the controller 130, as further described above in conjunction with FIG. 1.

The omnidirectional treadmill 105 of FIG. 1 and the repositioning systems 405 of FIG. 4 may be combined in some embodiments, resulting in a system including both the omnidirectional treadmill 105 and the repositioning systems 405. Such a configuration allows one or more sensors to be positioned, while allowing the subject to move on the omnidirectional treadmill 105. Other embodiments include the omnidirectional treadmill 105 with fixed sensors, and alternative embodiments have sensors coupled to repositioning systems 405 without including a treadmill within the first set of display panels 110, the second set of display panels 115, and the third set of display panels 120. Hence, different embodiments may include one or more of the omnidirectional treadmill 105 and the repositioning systems 405.

In some embodiments, one or more illumination sources are also positioned relative to the first set of display panels 110, to the second set of display panels 115, and to the third set of display panels 120 and are configured to emit light that illuminates the subject on the omnidirectional treadmill 105. In some embodiments, the illumination sources include one or more infrared projectors configured to emit light in infrared wavelengths to illuminate one or more portions of the subject, or to illuminate the subject. Some illumination sources may emit light in both visible wavelengths and in infrared wavelengths in some embodiments. Such infrared illumination allows the set of sensors 125 to capture additional features for use in generating a reconstruction of the subject, as further described below in conjunction with FIG. 5.

In some embodiments, when capturing images or video of the subject within the area enclosed by the first set of display panels 110, the second set of display panels 115, and the third set of display panels 120 (e.g., the subject on the omnidirectional treadmill 105), the controller 130 configures the first set of display panels 110, the second set of display panels 115, and the third set of display panels 120 to apply realistic lighting to the subject within the area enclosed by the first set of display panels 110, the second set of display panels 115, and the third set of display panels 120 (e.g., on the omnidirectional treadmill 105). This increases realism of the captured images or video of the subject within the area enclosed by the first set of display panels 110, the second set of display panels 115, and the third set of display panels 120. Alternatively, the controller configures the first set of display panels 110, the second set of display panels 115, and the third set of display panels 120 to apply neutral lighting to the subject within the area enclosed by the first set of display panels 110, the second set of display panels 115, and the third set of display panels 120. In some embodiments, the first set of display panels 110, the second set of display panels 115, and the third set of display panels 120 apply neutral lighting by color correcting content displayed on the first set of display panels 110, the second set of display panels 115, and the third set of display panels 120 to a set of gray values with low contrast in response to an instruction from the controller 130.

Applying neutral lighting to the subject within the area enclosed by the first set of display panels 110, the second set of display panels 115, and the third set of display panels 120 (e.g., on the omnidirectional treadmill 105) when capturing the sensor data allows the sensor data (e.g., videos, images) to be more easily modified by one or more CGI methods to be relit for different lighting conditions (e.g., lighting corresponding to different positions of a light source relative to the subject within the area enclosed by the first set of display panels 110, the second set of display panels 115, and the third set of display panels 120, lighting corresponding to different times of day). Further, the controller 130 may provide instructions to the first set of display panels 110, the second set of display panels 115, and the third set of display panels 120 to partially illuminate the subject using realistic lighting and to partially illuminate the subject on the omnidirectional treadmill using neutral lighting. In other embodiments, instructions provided by the controller 130 change illumination of the subject at different time intervals. For example, the instructions cause the first set of display panels 110, the second set of display panels 115, and the third set of display panels 120 to illuminate the subject with neutral lighting during a first time interval and to illuminate the subject with realistic lighting during another time interval. In some embodiments, the first set of display panels 110, the second set of display panels 115, and the third set of display panels 120 alternate between illuminating the subject using neutral lighting and using realistic lighting during consecutive time intervals (e.g., 48 frames per second).

The omnidirectional treadmill 105, the first set of display panels 110, the second set of display panels 115, the third set of display panels 120, and the set of sensors 125 is coupled to a controller 130 through a wireless connection, a wired connection, or a combination of wireless and wired connections. The controller 130 includes a processor and a non-transitory computer readable storage medium having instructions encoded thereon that, when executed by the processor, cause the processor to perform the functions further described below. The controller 130 receives images captured by cameras of the set of sensors 125 and stores the received images. In various embodiments, the controller 130 receives video captured by cameras from the set of sensors 125. Additionally, the controller 130 transmits content, or instructions for obtaining content, to one or more of the first set of display panels 110, the second set of display panels 115, and the third set of display panels 120 for display.

In various embodiments, optionally, the controller 130 transmits content to the first set of display panels 110, to the second set of display panels 115, and to the third set of display panels 120 to display visual cues (e.g., QR codes, barcodes, April tags, etc.) to a subject on the omnidirectional treadmill 105. For example, visual cues displayed by the first set of display panels 110, the second set of display panels 115, and the third set of display panels 120, provide instructions to the subject for a configuration process. As an example, displayed visual cues identify a configuration pose, such as a pose where the subject's body resembles the letter "T," for the subject to perform. The T-pose may be helpful to enable more complex computer graphics techniques, but may not be required to capture general digital acting performances. The set of sensors 125 capture configuration images of the subject in the configuration pose. One or more of the configuration images captured of the subject in the configuration pose include the visual cues displayed by the first set of display panels 110, the second set of display panels 115, and the third set of display panels 120. In other embodiments, any suitable information may be displayed by the visual cues displayed by the first set of display panels 110, the second set of display panels 115, or the third set of display panels 120.

In various embodiments, the controller 130 analyzes the sensor data to generate a three-dimensional representation of the subject 410. The three-dimensional representation may take any appropriate form, such as a polygonal model, a volumetric model, a point cloud model, or any other type of model that can represent three-dimensional data and its color. Examples of a three-dimensional representation of the subject include a three-dimensional polygonal model, volumetric representation, neural network representation, implicit surface representation, or other models, of contents of the captured sensor data. Various methods could be used for example photogrammetry, mesh generation from lidar point clouds, mesh generation from various depth maps, other methods from sensors such as quantum lidar sensors, etc. For example, the control generates information representing objects within the area enclosed by the first set of display panels 110, the second set of display panels 115, and the third set of display panels 120 and within a field of view of at least one camera of the set of sensors 125. In some embodiments, the controller 130 generates information describing a specific object (e.g., the subject) within fields of view of one or more sensors of the set of sensors 125. For example, the controller 130 generates the three-dimensional representation of the subject on the omnidirectional treadmill 105 and removes or filters other objects included in fields of view of one or more cameras of the set of sensors 125.

Additionally, from color information obtained by cameras of the set of sensors 125, the controller 130 generates a texture image for applying texture to the three-dimensional representation of the subject. In some embodiments, the texture image is a two-dimensional image. To generate the texture image, in some embodiments, the controller 130 determines a color value for each point on the three-dimensional representation of the subject (e.g., each point on a three-dimensional polygonal model) from a sensor of the set of sensors 125 that points perpendicular to the surface normal of the point of the three-dimensional representation of the subject. Selecting the color value for a point of the three-dimensional representation of the subject from a sensor that is perpendicular to the surface normal of the point minimizes reflective or specular color of the color value. This results in a color texture map for the three-dimensional representation of the subject including a lighting component that is capable of later rendering through one or more CGI methods from various angles. In other embodiments, the texture map is a final sensor angle dependent generated texture map. In such embodiments, the final camera angle from which a camera captured images of the subject within the area enclosed by the first set of display panels 110, the second set of display panels 115, and the third set of display panels 120 (e.g., on the omnidirectional treadmill 105) or other object, weighting logic is used to determine the texture image. For example, the controller 130 compares an angle of the final sensor relative to angles at which other cameras of the set of sensors 125 captured images. During creation of the texture image, the controller 130 weights images captured by sensors of the set of sensors 125 having angles at which images were captured that are within a threshold value of the angle of the final sensor. Using the final sensor angle results in a realistic texture image for the three-dimensional representation of the subject.

As further described below in conjunction with FIG. 5 the controller 130 may use the three-dimensional representation of the subject in a three-dimensional scene to render video data that depicts an acting performance of the subject that was captured within the area enclosed by the sets of display panels 110, 115, 120 and optionally on the omnidirectional treadmill 105. This rendering may be performed by one or more servers or other computing devices that are separate from the controller 130. In various embodiments, as further described below in conjunction with FIG. 5, the three-dimensional representation of the subject and the texture image are used to generate the video data containing the subject's acting performance.

Figure 5:
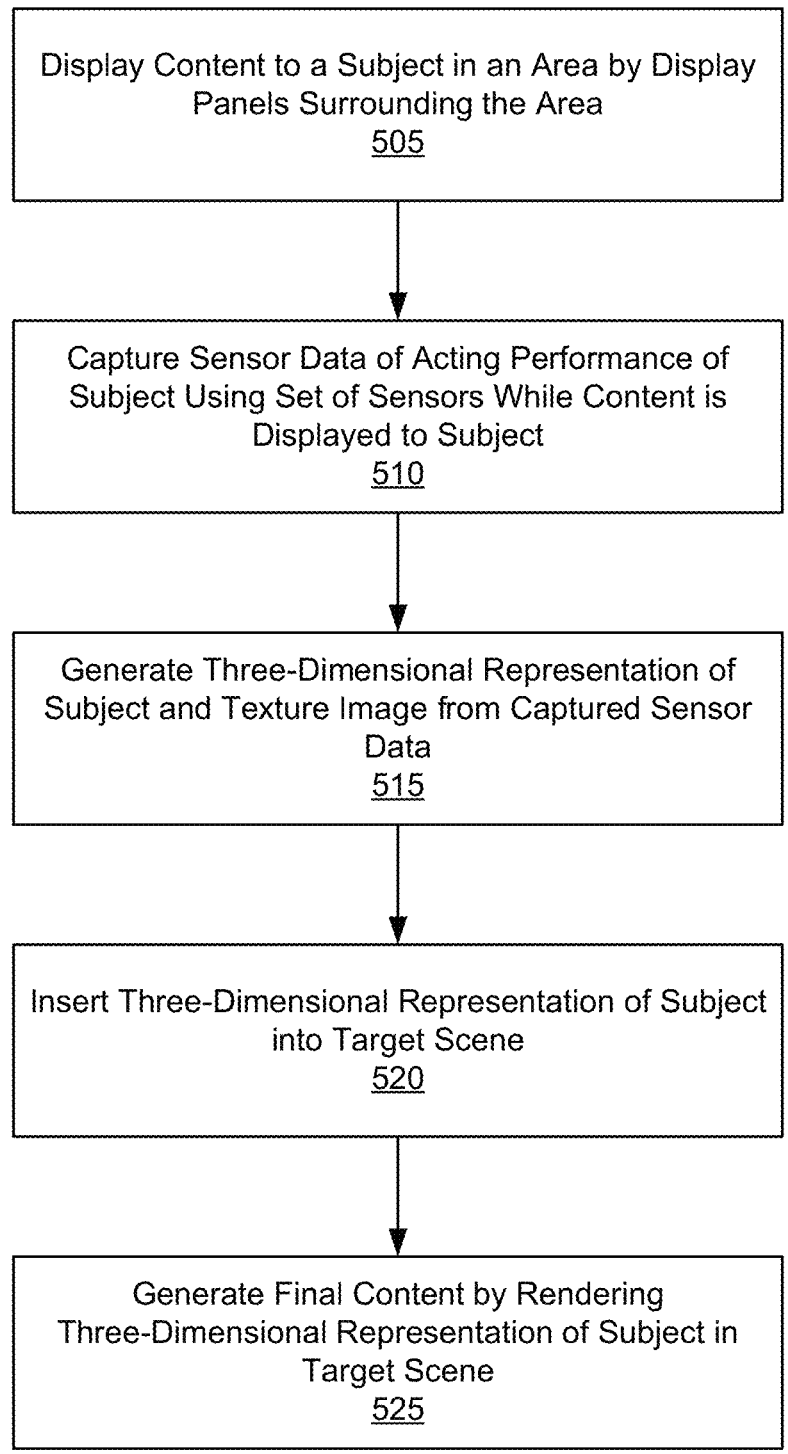
FIG. 5 is a flowchart of a method for generating video content containing a digital acting performance by a subject, in accordance with an embodiment.

Generation of Media Content Containing a Three-Dimensional Representation of a Subject FIG. 5 is a flowchart of one embodiment of a method for generating media content (such as video data) containing a three-dimensional representation of a subject from a system for enabling a digital acting performance, such as the system 100 further described above in conjunction with FIGS. 1-4.

Although this method is described using examples for generating video data, any appropriate depiction of the subject's acting performance from the three-dimensional representation of the subject from the captured sensor data is possible. In various embodiments, the method includes different or additional steps than those described in conjunction with FIG. 5. Further, in some embodiments, the method may perform the steps in a different order than the order described in conjunction with FIG. 5 or may include fewer steps than those described in conjunction with FIG. 5.

In the process shown in FIG. 5, a subject is first positioned inside an area that is contained by a first set of display panels 110 at least partially enclosing the area. The area may contain an omnidirectional treadmill 105, on which the subject may stand and move around without actually leaving the area. In various embodiments, a second set of display panels 115 is positioned above the omnidirectional treadmill 105, and a third set of display panels 120 may be positioned below a surface of the omnidirectional treadmill 105 or in a common plane as the surface of the omnidirectional treadmill 105. A set of sensors 125 are positioned to capture information (e.g., images, video, depth, etc.) of the subject from different angles and from different locations around the area.

One or more of the first set of display panels 110, the second set of display panels 115, and the third set of display panels 120 display 505 content to the subject. In various embodiments each of the first set of display panels 110, the second set of display panels 115, and the third set of display panels 120 display content to the subject so the combination of content displayed by the first set of display panels 110, the second set of display panels 115, and the third set of display panels 120 displays a multidimensional scene to the subject. In various embodiments, the content displayed to the subject is obtained from the controller 130.

The content displayed on the panels may be obtained, e.g., from a 360-degree camera that captures a scene that depicts the scene in which the subject's acting performance is to be inserted, albeit without the subject's performance. To provide realistic visual cues for the subject, the content may be obtained by capturing the scene from the perspective of the subject—i.e., the point of view where the subject is to be inserted into the scene. This way, the subject will see the scene from the perspective of the subject's character in the final product. If the scene is generated from a three-dimensional model instead of captured by a camera, the content to be displayed to the subject instead be rendered from the perspective of the subject's character using CGI techniques, such as ray tracing.

While the content is being displayed 505 to the subject, the set of sensors 125 capture 510 sensor data depicting the subject at different times (e.g., continuously capture the subject while the subject performs within the area), such as a sequence of images or video of the subject. This allows the set of sensors 125 to capture movement or reactions of the subject while the content is displayed 505, as further described above in conjunction with FIG. 1. Hence, the sensor data captured 510 by the set of sensors 125 describe the subject's interactions with or reactions to the displayed content. Displaying content to the subject via the first set of display panels 110, the second set of display panels 115, and the third set of display panels allows the subject's movement or reactions to more accurately reflect an environment with which the subject interacts, compared to conventional methods that use inanimate objects or other props to a subject and subsequently insert portions of the subject's environment in place of the inanimate objects or other props after capturing images of the subject. This greatly improves the experience for the subject, for example, when delivering a performance.

Figure 6:
FIG. 6 is an example three-dimensional representation of a subject generated from captured sensor data, in accordance with an embodiment.
Figure 7:
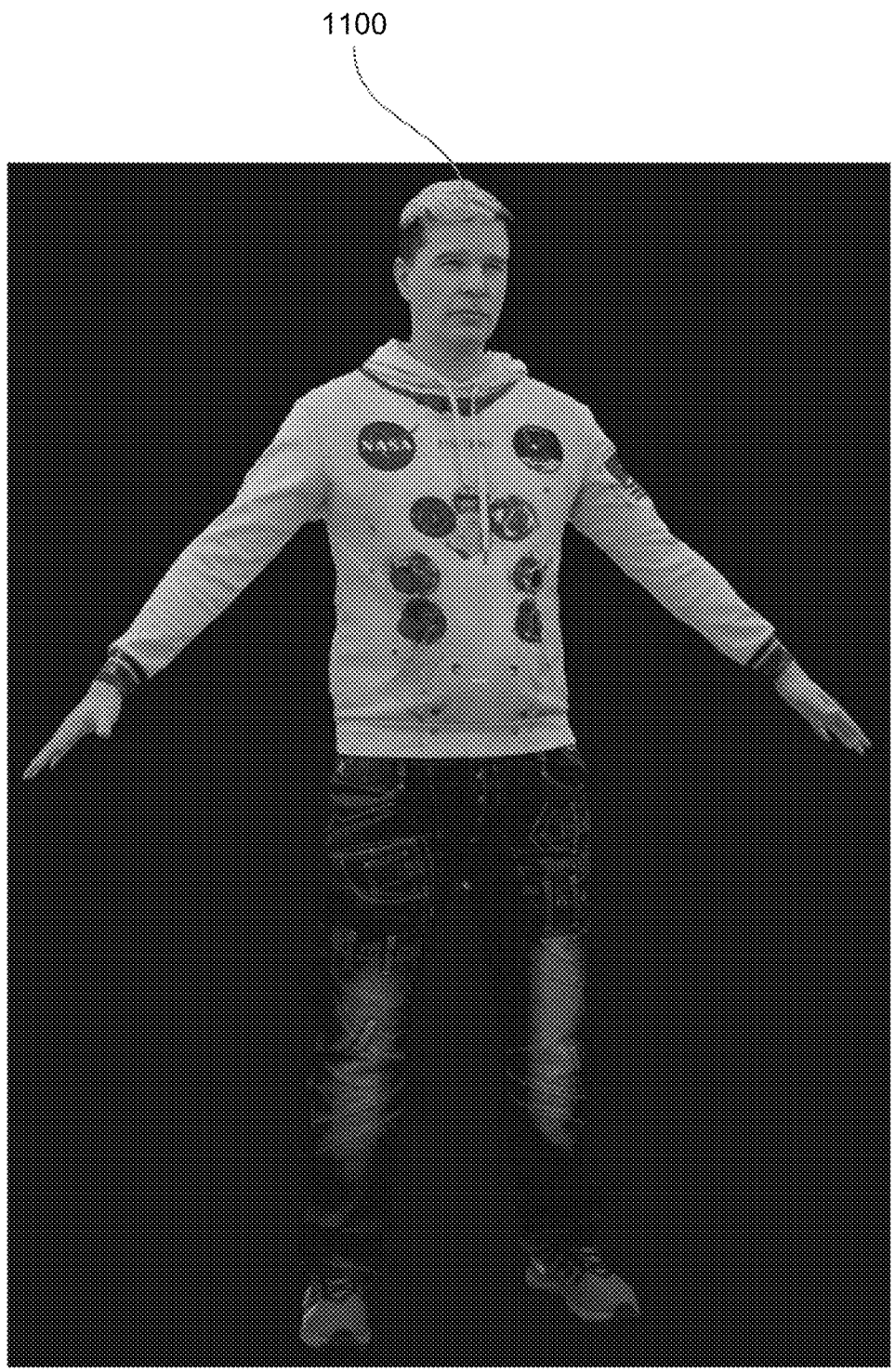
FIG. 7 is an example rendering of a subject generated from a three-dimensional representation of the subject and a texture image, in accordance with an embodiment.

As further described above in conjunction with FIG. 1, the controller 130 generates 515 a three-dimensional representation of the subject and a texture image from the captured sensor data while the content was displayed 505 to the subject. FIG. 6 shows one example of a three-dimensional representation 1000 of the subject generated by the controller 130 from the captured sensor data. As further described above in conjunction with FIG. 1, the texture image describes application of texture to the three-dimensional representation of the subject from color information or information describing angles at which sensors of the set of sensors 125 captured images or video of the subject. FIG. 7 shows an example rendering of a subject generated from a three-dimensional representation of the subject and a texture image applied to the three-dimensional representation.

The three-dimensional representation of the subject is then inserted 520 into a target scene. In an embodiment where the target scene is rendered from a three-dimensional model, the three-dimensional representation of the subject is placed at a desired location in the model. In an embodiment where the target scene is captured by a camera, a location of a virtual camera relative to the three-dimensional representation is determined so that a two-dimensional representation of the subject may be rendered and combined with the target scene captured by the camera.

In various embodiments, final content for the scene that includes the acting performance of the subject is generated 525. The final content may comprise a series of image frames that constitute a video sequence, and may be in any format desired (e.g., film format of 24 frames per second). To generate 525 the final content of the scene, in one embodiment, the three-dimensional model of the scene containing the three-dimensional representation of the subject is rendered to create a final output. For example, the final content can be generated 525 from the texture image and the three-dimensional representation of the subject using one or more CGI methods. For example, frames of the subject in the target scene corresponding to different times when sensor data was captured are rendered, allowing generation of the final content at a desired frame rate. This allows the system to generate 525 a series of frames that contain the acting performance of the subject over time and inserted within the target scene.

In various embodiments, renderings of the subject from its three-dimensional representation may be used to subsequently generate content including the subject from one or more camera angles relative to the subject, allowing the subject to be displayed from various angles or with various lighting parameters. For example, a rendering of the subject may be inserted into a three-dimensional scene, and a sequence of frames of the subject in the three-dimensional scene may be rendered by ray tracing from a virtual camera having a specified position relative to the subject, allowing generation of content depicting the subject within or interacting the three-dimensional scene. Hence, generating 525 the final content containing the subject enables the subject's performance to be subsequently inserted into different video or other content, allowing the environment in which the digital copy of the subject is presented in the video to be designed and constructed after the digital copy of the subject has been generated 525. This provides greater flexibility in how the digital copy of the subject is used in content and reduces costs by allowing the subject to be included in a range of different content without separately capturing video of the subject in different content. Further, using renderings of the three-dimensional information of the subject's performance allows for a wider range of positions in which a virtual camera may be positioned relative to of the subject when generating content.

Figure 8:
FIG. 8 is an example image from video content that includes multiple representations of the same subject, in accordance with an embodiment.

One of the capabilities of the system described herein is illustrated by FIG. 8, which shows an example image from video content that includes multiple representations of the same subject. In film, it may be desired to have an actor appear multiple times in a single image or in a single sequence of video (e.g., a twin scene). Conventionally, this duplication of an actor has been achieved using a split screen. However, the split screen approach is made complicated, costly, time-consuming, or laborious with moving cameras and complex movements of the actor. Embodiments of the system for enabling a digital acting performance described herein, provide a more efficient way to duplicate an actor in a single image or sequence of video.

To duplicate a subject in an image or in a sequence of video, a target scene 800 containing images of one version of the subject is captured. The target scene 800 can be captured by simply filming the subject using conventional video cameras, for example using a 360-degree camera that captures images along one or more of a horizontal orbit, a vertical orbit, or a diagonal orbit around the subject. This allows images or video of the subject to be captured, while the 360-degree camera captures images of the surroundings of the subject from the alternative location where the duplicate of the subject is to appear. Alternatively, the target scene 800 may be generated using the process described in FIG. 5. Once the target scene containing one version 805 of the subject is obtained, it is used as the content displayed to the same subject in the process described in FIG. 5, thereby inserting a second version 810 of the same subject in the final content. This way, the subject benefits from visual cues from the subject's first acting performance when performing a second time as the twin.

Figure 9:
FIG. 9 is an example image from video content that includes representations of multiple subjects, in accordance with an embodiment.

Another use case of the system is illustrated by FIG. 9, which shows an example of an image 900 including representations of multiple subjects. In the example of FIG. 9, multiple representations 905A, 905B, 905C, 905D (also referred to individually and collectively using reference number 905) are included in the image 900. Each representation 905 of a subject is generated from sensor data of the subject captured by the system 100 or the system 400 using the process of FIG. 5. To generate the image 900, in one example, the controller 130 provides content containing a target scene to a first subject 905 and captures a three-dimensional representation of the first subject 905, e.g., using the process of FIG. 5. The three-dimensional representation of the first subject 905 is then added to the target scene, and this modified content is presented to another subject 905, whose acting performance is then captured according to the process of FIG. 5. This is repeated for each of the subjects 905 until all of their acting performances are captured. The final content is then obtained by rendering the three-dimensional representations of each of the subjects 905 into the target scene to create the final content.

Beneficially, inserting digital copies of one or more subjects into edited video allows the video to be captured with fewer subjects present when the video is initially captured. This reduces the complexity for initially obtaining the video, while maintaining flexibility for a number of subjects included in the edited video or which subjects are included in the edited video. Additionally, inserting a digital copy of the subject into the edited video allows subjects to be in different locations from each other when video is captured, reducing an amount of travel for subjects, and reducing an amount of time for capturing different portions of video including multiple subjects.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
a first set of display panels surrounding an area;
a set of sensors positioned at a set of angles, each angle different from other angles of the set, each sensor of the set configured to capture sensor data of a subject positioned within the area;
one or more repositioning systems coupled to at least a subset of the sensors, a repositioning system configured to reposition a sensor in response to receiving an instruction; and
a controller coupled to the first set of display panels and to the set of sensors, the controller configured to:
transmit content to the first set of display panels for display, the content displayed by the first set of display panels comprising a multidimensional scene;
receive sensor data of the subject within the area captured by a plurality of sensors of the set of sensors while the multidimensional scene is displayed by the first set of display panels;
determine, based on the sensor data, a relative motion of the subject with respect to the first set of display panels;
generate instructions for repositioning one or more of the sensors based on the determined location relative motion of the subject within the area; and
transmit the instructions to at least a set of the one or more repositioning systems to reposition at least the subset of sensors according to the generated instructions.

2. The system of claim 1, further comprising:
a second set of display panels positioned above the area; and
a third set of display panels positioned opposite to the second set of display panels and coupled to the controller, the third set of display panels configured to receive additional content comprising the multidimensional scene from the controller and to display the third content.

3. The system of claim 1, further comprising an omnidirectional treadmill located within the area.

4. The system of claim 3, wherein the set of sensors are configured to:
capture sensor data of the subject positioned on the omnidirectional treadmill.

5. The system of claim 1, wherein the controller is further configured to:
generate three-dimensional representation of the subject from the received sensor data.

6. The system of claim 1, wherein a repositioning system comprises an arm configured to reposition one or more sensors in response to receiving an instruction from the controller.

7. The system of claim 6, wherein the instruction from the controller causes the arm to reposition the one or more sensors so a certain portion of the subject is within a field of view of the one or more sensors.

8. The system of claim 7, wherein the arm comprises a pan and tilt robotic arm or an arm that is configured to pan or tilt or cause one or more sensors to pan or tilt on the arm.

9. The system of claim 1, wherein the controller is further configured to:
generate a three-dimensional representation of the subject from the received sensor data.

10. The system of claim 9, wherein the controller is further configured to:
generate a texture image configured to apply texture to the three-dimensional representation of the subject from the received sensor data.

11. A system comprising:
an omnidirectional treadmill;
a first set of display panels surrounding an area containing the omnidirectional treadmill;
a set of sensors positioned at a set of angles, each angle different from other angles of the set, each sensor of the set configured to capture sensor data of a subject positioned on the omnidirectional treadmill; and
a controller coupled to the omnidirectional treadmill, to the first set of display panels, and to the set of sensors, the controller configured to:
transmit content to the first set of display panels for display, the content displayed by the first set of display panels comprising a multidimensional scene;
receive sensor data of the subject positioned on the omnidirectional treadmill captured by a plurality of sensors of the set of sensors while the multidimensional scene is displayed;
determine, based on the sensor data, a relative motion of the subject with respect to the first set of display panels;
generate instructions for repositioning one or more of the sensors based on the determined relative motion of the subject within the area; and
transmit the instructions to a set of one or more repositioning systems to reposition at least one of the set of sensors according to the generated instructions.

12. The system of claim 11, further comprising:
a second set of display panels positioned above the omnidirectional treadmill; and
a third set of display panels positioned below the omnidirectional treadmill and opposite to the second set of display panels and coupled the controller, the third set of display panels configured to receive additional content comprising the multidimensional scene from the controller and to display the third content.

13. The system of claim 11, wherein the controller is configured to modify the content displayed by the first set of display panels based on information from the omnidirectional treadmill describing movement of the subject.

14. The system of claim 11, further comprising:
one or more repositioning systems coupled to at least a subset of the sensors, a prepositioning system configured to reposition a sensor in response to receiving an instruction.

15. The system of claim 14, wherein the controller is further configured to:
generate instructions for repositioning one or more of the sensors based on a determined location of at least a portion of the subject within the area; and
transmit the instructions at least a set of the one or more repositioning systems.

16. The system of claim 11, wherein the controller is further configured to:
generate a three-dimensional representation of the subject from the received sensor data.

17. The system of claim 16, wherein the controller is further configured to:
generate a texture image configured to apply texture to the three-dimensional representation of the subject from the received sensor data.

18. A method comprising:
- displaying a set of images to a subject positioned within an area enclosed by a set of display panels at least partially surrounding the area;
- capturing sensor data of an acting performance of the subject within the area using a set of sensors positioned at a set of angles, each angle different from other angles of the set of angles and each sensor of the set of sensors configured to have a field of view within at least a portion of the area;
- determining, based on the sensor data, a relative motion of the subject with respect to the set of display panels;
- repositioning at least one sensor of the set of sensors based on the determined relative motion of the subject within the area;
- generating a three-dimensional representation of the subject from the sensor data of the subject captured by the set of sensors; and
- generating texture data for applying texture to the three-dimensional representation of the subject from the sensor data of the subject captured by the set of sensors.

19. The method of claim 18, further comprising:
- generating video data of the acting performance of the subject by rendering the three-dimensional representation of the subject and the texture data in a scene.

* * * * *